United States Patent [19]

Meyers

[11] Patent Number: 5,049,936
[45] Date of Patent: Sep. 17, 1991

[54] ELECTROPHOTOGRAPHIC COPIER/DUPLICATOR HAVING DUAL IMAGING APPARATUS

[75] Inventor: Mark M. Meyers, Rochester, N.Y.

[73] Assignee: Eastman Kodak Company, Rochester, N.Y.

[21] Appl. No.: 459,502

[22] Filed: Jan. 2, 1990

[51] Int. Cl.⁵ .......................................... G03G 15/04
[52] U.S. Cl. ................................. 355/232; 355/46; 355/50; 355/241; 355/310
[58] Field of Search ................. 355/232, 141, 310, 40, 355/46, 60, 64, 65, 66, 55, 56, 57, 50; 353/34, 82, 89, 122

[56] References Cited

U.S. PATENT DOCUMENTS

| | | | |
|---|---|---|---|
| 3,703,335 | 11/1972 | Hoffman | 355/51 |
| 4,088,401 | 5/1978 | Rees et al. | 355/46 X |
| 4,110,023 | 8/1978 | Silverburg | 355/46 X |
| 4,113,370 | 9/1978 | Durbin | 355/46 X |
| 4,134,670 | 1/1979 | Spinelli | 355/46 X |
| 4,139,297 | 2/1979 | Hayashi et al. | 355/288 |
| 4,390,267 | 6/1983 | Minor | 355/228 |
| 4,426,153 | 1/1984 | Libby et al. | 355/57 X |
| 4,634,248 | 1/1987 | Ostermeier | 355/40 X |
| 4,684,241 | 8/1987 | Acquaviva | 355/310 |
| 4,873,550 | 10/1989 | Watanabe | 355/232 |

FOREIGN PATENT DOCUMENTS

| | | | |
|---|---|---|---|
| 0134664 | 8/1983 | Japan | 355/241 |
| 0070430 | 4/1985 | Japan | 355/232 |

Primary Examiner—Joan H. Pendegrass
Assistant Examiner—J. E. Barlow, Jr.
Attorney, Agent, or Firm—Tallam I. Nguti

[57] ABSTRACT

An electrophotographic copier/duplicator having a 17"×11" wide endless photoconductor includes single imaging apparatus for forming and processing a single 17"×11" image at a time, within a 17"×11 " image frame of its photoconductor, and dual imaging apparatus for simultaneously forming and processing two 8.5"×11" images at a time, within a 17"×11" image frame of such photoconductor.

16 Claims, 3 Drawing Sheets

ELECTROPHOTOGRAPHIC COPIER/DUPLICATOR HAVING DUAL IMAGING APPARATUS

BACKGROUND OF THE INVENTION

This invention relates to electrophotographic copiers and duplicators, and more particularly to the optical imaging apparatus in such copiers or duplicators.

Electrophotographic copying and duplicating equipment, such as optical copiers and duplicators, which can produce fused toner copies of an original image on suitable copy sheets, are well known. See, for example, U.S. Pat. Nos. 4,139,297 and 4,390,267. Typically, such equipment includes optical imaging apparatus consisting of a transparent platen for holding an original document to be copied, flash lamps for illuminating the document, a lens system, and light control devices for focusing imaging rays, which are reflected from the background portions of the original document, onto an image frame area of a charged photoconductive image-bearing member.

With such imaging apparatus, a single latent image of the original document can conventionally be formed on an image frame area of the charged photoconductor. The reflected light rays, upon impinging on portions of the charged (photoconductive) image frame, expose such portions, thereby dissipating charges therein. Undissipated portions of the image frame area, that is, those portions where latent charges remain, correspond to the image portions of the original document—hence constituting the latent charge image of such original.

Various size documents, for example, 17"×11" original documents and 8.5"×11" original documents can be optically imaged in this manner. As is well known, the latent electrostatic image thus formed can thereafter be processed through sequential steps of the copier or duplicator, in which the image is developed, transferred to a suitable receiver sheet, and then fused onto such receiver sheet in order to form a sheet copy of the original document.

Conventionally, optical copiers and duplicators, which for example have a closed loop sixty-six (66") inch, six (6) image frame area, seventeen (17") inch wide photoconductor, can sequentially function as above to produce both 17"×11" and 8.5"×11" copies. Typically, such copiers and duplicators do so in what can be characterized as a single imaging mode. Such a copier or duplicator operates in a single imaging mode when it forms and processes only a single image, in a single image area of its photoconductor, during each of its sequential steps of image formation, development, transfer, and fusing. Additionally, each such copier or duplicator forms the 17"×11" and 8.5"×11" images on its photoconductor such that the long dimension of each image, that is the 17" and the 11" dimensions respectively, are across the 17" width of the photoconductor. As such, the maximum number of full 17"×11" images that can be formed in one complete revolution of the photoconductor is six (6), while the similar number for full 8.5"×11" images is only seven (7)—that is, 66"×8.5".

It is clear that in such copiers and duplicators, the productivity or number of 8.5"×11" images, relative to 17"×11" images, is undesirably limited. Furthermore, much of the in photoconductor such a copier or duplicator is unused during the production of such 8.5"×11" images.

SUMMARY OF THE INVENTION

It is an object of the present invention to provide an optical copier or duplicator that, at a given speed, can substantially increase the maximum number of copies it can produce per one complete revolution of its photoconductor.

It is another object of the present invention to provide an optical copier or duplicator that substantially increases the maximum number of 8.5"×11" copies, relative to the maximum number of 17"×11" copies, which such copier or duplicator can produce at any one given speed.

It is a further object of the present invention to provide a copier or duplicator having simplified sheet supply and handling apparatus for producing 17"×11" and 8.5"×11" copies.

In accordance with the present invention, a copier or duplicator is provided for electrophotographically producing copies of an original document on suitable receiver sheets. The copier or duplicator includes a movable, endless photoconductive member that has a width $2W$ and a plurality of $2W \times L$ dimension image frames. The copier or duplicator also includes means for electrostatically charging the photoconductor, and optical imaging apparatus for forming electrostatic latent images on the photoconductive member. The optical imaging apparatus of the present invention is operable in a single imaging mode for forming a single $2W \times L$ electrostatic latent image of an original document on a $2W \times L$ image frame of the photoconductor, or in a dual imaging mode for simultaneously forming two $L \times W$ electrostatic latent images of an original document on a $2W \times L$ image frame of such photoconductor.

The optical imaging apparatus, as such, includes a pair of movable first and second lenses that each have first and second positions relative to the center of an original document being imaged. The first position of each lens is equally offset a distance $d_1$ from the center of such document.

The copier or duplicator further includes means for developing the electrostatic latent images formed on the photoconductor, means for transferring the developed images to a suitable receiver sheet, means for fusing the transferred images onto such sheet, and post-fusing means for handling such receiver sheets for subsequent removal by an operator.

BRIEF DESCRIPTION OF THE DRAWINGS

In the detailed description of the invention presented below, reference is made to the drawings, in which.

DETAILED DESCRIPTION OF THE INVENTION

Figure 1:
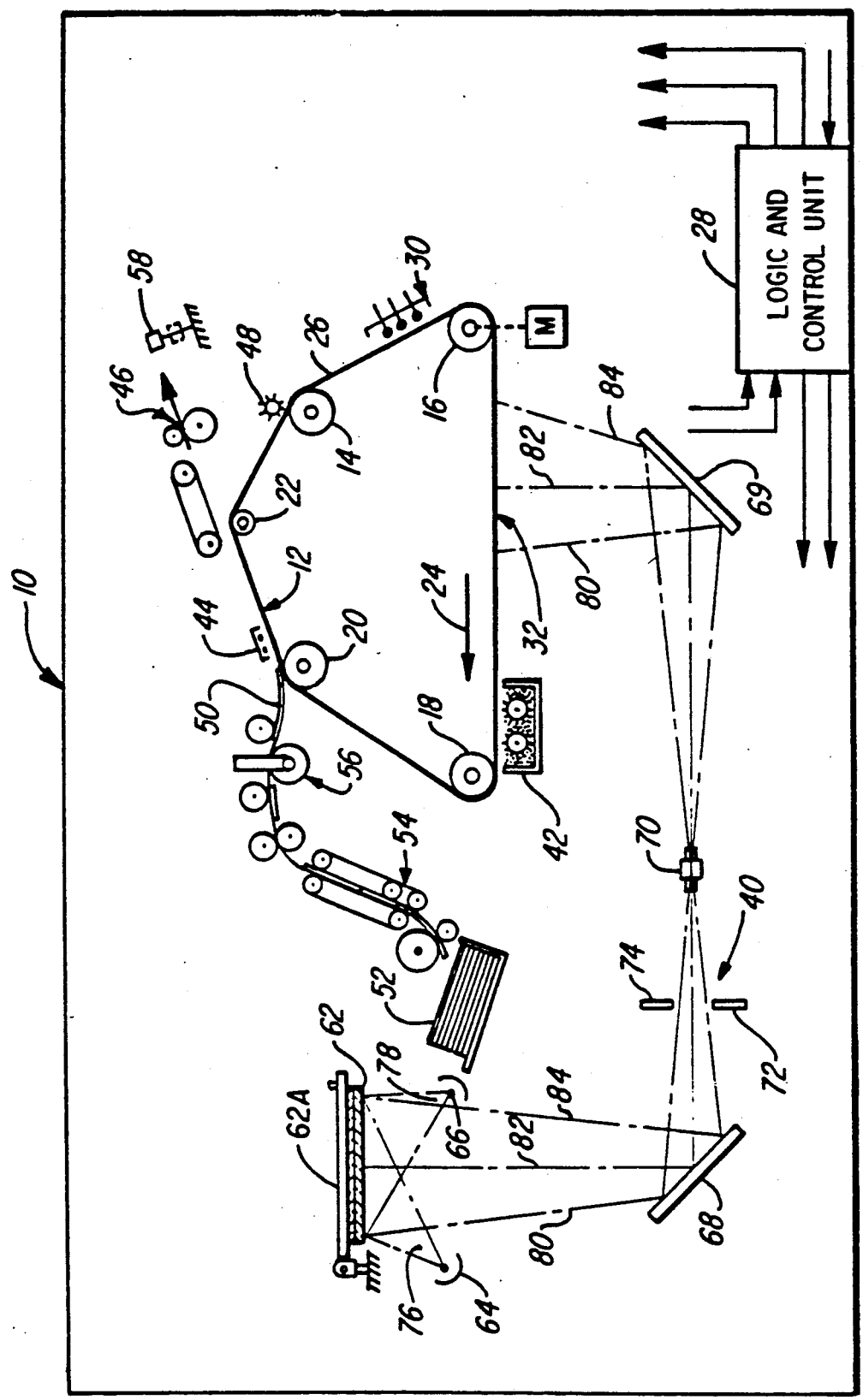
FIG. 1 is a schematic view showing a side elevational view of an electrophotographic copier or duplicator of the present invention.

Referring now to FIG. 1, an optical electrostatographic copier or duplicator is shown schematically as 10. The copier or duplicator 10 includes a photoconductive member 12 which can be a rigid drum or an endless web, as shown, trained about a plurality of rollers 14–22. One of these rollers, for example 16, can be a drive roller that is coupled to a drive motor M for moving the member 12 in the direction of the arrow 24. The photoconductive member 12 includes an image-bearing surface 26 that is divisible into a number of image frame areas, for example six (6) frame areas.

Movement of the member 12 by the roller 16, as above, causes successive image frame areas of its surface 26 to sequentially pass through a series of electrostatographic process stations (to be described below). The operations of these stations are controlled with the help of a logic and control unit (LCU) 28. As is well known, such a control unit 28 may have stored programs that are responsive to input signals for sequentially actuating and deactuating the process stations and other functions of the copier or duplicator 10.

The electrostatographic stations of such copier or duplicator 10 first include a charging station 30 at which the surface 26 of the photoconductive member 12 is sensitized by means such as a corona charger that applies thereto a uniform layer of electrostatic charges. The next station is an exposure station 32 at which a latent charge image of an original document is formed on an image frame area of the charged surface 26. Such image formation, in the case of optical copiers and duplicators, is carried out by means of optical imaging apparatus generally designated 40. Such optical imaging apparatus and image formation will be described in detail below with respect to the single and dual imaging modes of the present invention.

The electrostatographic process stations further include a development station 42, an image transfer station 44, a fusing station 46, and a cleaning station 48. At the development station 42, means are provided, as is well known, for developing the latent charge image (formed at the exposure station 32) with oppositely charged toner particles. At the transfer station 44, such toner developed image is transferred with the help of a corona charging device, for example, to a copy sheet 50 that is fed in registration, to the station 44. As shown, the copy sheet 50 is fed from a supply 52 of such sheets by sheet handling apparatus 54, through a registration assembly 56. The toner image on the copy sheet 50 can thereafter be moved to and fused (onto such sheet 50) at the fusing station 46. Following image transfer at 44, residual toner and other particles remaining on each image frame area of the surface 26 are removed at the cleaning station 48 prior to each such image frame area again reaching and going through the charging station 30.

Figure 3A:
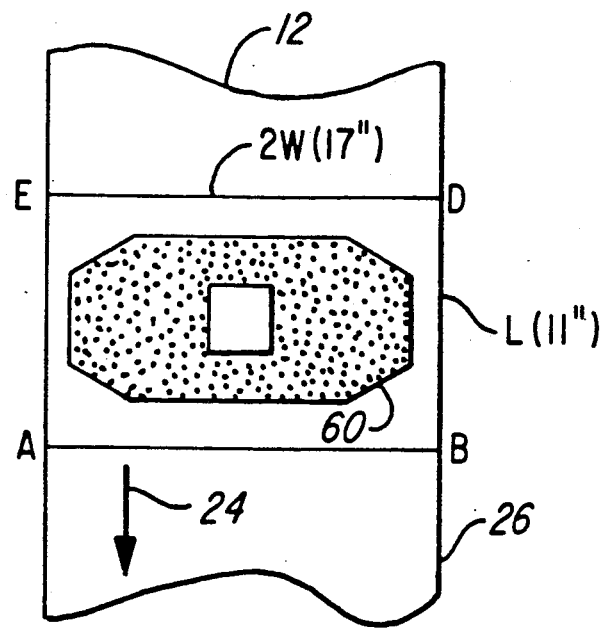
FIG. 3A is a top view of a $2W \times L$ dimension image on a $2W \times L$ image frame of the photoconductor of the present invention.
Figure 3B:
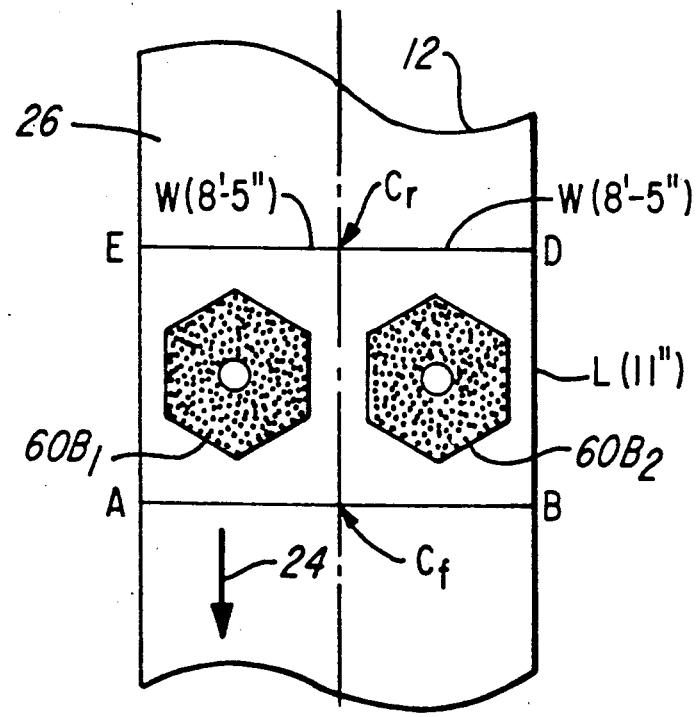
FIG. 3B is a top view of two $L \times W$ dimension images on a $2W \times L$ image frame of the photoconductor of the present invention.

In the present invention, means are provided for forming and processing 17"×11" images conventionally. In other words, in the present invention, a single 17"×11" image can be formed at a time, on a single 17"×11" image frame, and processed singly as such during each of the subsequent sequential steps of image development, image transfer, and image fusing. Accordingly, the photoconductor 12 of the present invention is seventeen inches (17") wide, and circumferentially is long enough to be divisible, for example, into six (6) image frame areas. As such, the photoconductor 12 will have a circumferential or loop dimension slightly greater than sixty-six (66") inches, (that is, 11"×6), so as to allow for interframe areas. Each image frame area, ABDE, as shown in FIGS. 3A and 3B, has a cross-track dimension AB that is 17", and in-track dimension BD that is 11", relative to the direction of movement of the member 12. As such, each frame ABDE is suitable for forming and processing 17"×11" images therein, e.g. the image 60.

For producing such 17"×11" images, the means at 32 for charging, and at 48 for cleaning the surface 26 of the member 12 of the present invention, are made long enough to handle such a wide photoconductor 12. Similarly, the means for imaging at 32, developing at 42, transferring at 44, and fusing at 46, images produced thereon are made so as to be suitable for handling a 17"×11" image 60 sideways, that is, with a lead edge AB as shown in FIG. 3A. Additionally, the copy sheet supply 52, as well as, the handling apparatus 54 and 56, similarly are adapted for handling 17"×11" sheets sideways.

Referring now to FIG. 1, the optical imaging apparatus 40 of the present invention includes a transparent platen 62, flash lamps 64, 66, an object mirror 68, an image mirror 69, a lens system 70, and adjustable light baffles 72 and 74. The transparent platen 62, which may include a hinged cover 62A, for example, is for holding an original document (object), for example a 17"×11" document 75A, which is to be imaged and copied or duplicated. The platen 62 therefore should be large enough to handle 17"×11" documents. For optical imaging in the present invention, such document is placed face down directly on the platen and then overlayed with the cover 62A, which typically has a white opaque undersurface.

Figure 2A:
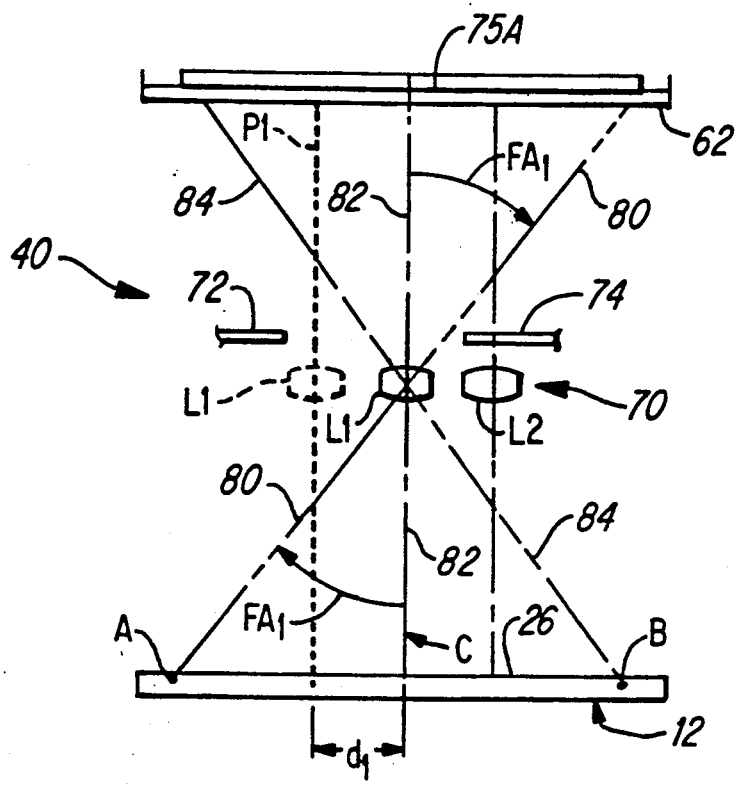
FIG. 2A is a schematic view of the optical imaging apparatus of the present invention in a single imaging mode.

The flash lamps 64, 66, when energized, produce a flash of light of which rays represented by rays 76, 78 fall on and illuminate the document 75A through the transparent platen 62. Some of the light rays 76, 78, as is well known, will fall on image areas of the document 75A, (image areas are areas covered with some type of visibly colored marking particles), and thus will be effectively absorbed. Other of the rays 76, 78, however, will fall on background areas (that is, non-image areas) of the document and will be reflected as rays 80, 82, 84. FIGS. 1 and 2A, onto the charged surface 26 of the photoconductor 12.

Referring now to FIGS. 1, 2A and 3A, the light rays 80, 82, 84 are controlled, as indicated in FIG. 1, by means of the object mirror 68, the adjustable light baffles 72, 74, the lens system 70, and the image mirror 69, for focusing onto an image frame ABDE of the moving surface 26 at the exposure station 32. The reflected light rays 80, 82, 84, upon falling or impinging on the charged frame ABDE, will expose some but not all areas of such frame. Such rays will photoconductively dissipate charge from the exposed areas, thereby leaving the unexposed areas still charged. The unexposed areas as such are equivalent to the image areas of the illuminated document 75A, and the exposed areas are equivalent to the background areas of such document. The result of such exposure/non-exposure of areas of the frame ABDE is formation of a latent charge image, for example the image 60 of the document 75A, within the frame ABDE.

As shown, the lens system 70 of the apparatus 40 includes a first lens L1 (FIGS. 2A, 2B) that is corrected to have a field angle $FA_1$ suitable for producing high quality images of a 17"×11" document object, for example the document 75A, FIG. 2A. As shown, the lens L1 is movable and has a first position P1, which is offset a distance $d_1$ from the center C of the document 75A, as well as, a second position P2 (not shown) which is coincident with such center C. The lens L1, as shown, can be used in such second position P2 conventionally to form the single image 60 of the document 75A within the frame ABDE, as described above. When the lens L1 is in such second position P2, all reflected light rays from the illuminated document 75A pass through or are focused by only such first lens L1. As such the apparatus 40 is operating essentially in the conventional single imaging mode as described above, and therefore is capable of producing a maximum of six (6) such images 60 in one complete revolution of the six (6) image frame photoconductor 12. The timing and operation of the optical imaging apparatus 40 are of course controlled by means of the LCU 28. As described above, each such elctrostatic latent image 60 formed as such can subsequently be developed, transferred onto a suitable receiver sheet, and then fused to form a sheet copy of the document so imaged.

Referring now to FIGS. 1-3B, the copier or duplicator 10 of the present invention, besides being capable of producing 17"×11" images and copies as above, is also capable of producing 8.5"×11" images and copies. Such 8.5"×11" images and copies, as pointed out above, can of course be produced conventionally in a single imaging mode. In that case, the maximum number of full 8.5"×11" images that can be produced per single revolution of the photoconductor 12 (at any given speed) is only seven (7), (that is, 66"÷8.5"). As pointed out, this limitation is due in part to the limited ability of conventional optical imaging apparatus which operate in a single imaging mode as described above, and as such, are capable of forming only a single image, on a single image frame, during each flash/exposure sequence step. Additionally of course, the limitation is also due in part to single image transfer, and single copy sheet handling apparatus in conventional copiers and duplicators.

However, in the present invention, means are provided for substantially increasing the maximum number of images and, hence, the number of 8.5"×11" copies that can be produced per single revolution of the photoconductor 12. Such means in the present invention include a second movable lens L2 in the lens system 70, and a post-fusing mechanism 58 (FIG. 1) for precisely slitting a copy sheet 50 exiting the fusing station 46. The device 58, for example, may include a blade edge and means for moving the blade edge into a first position for slitting the sheet 50, for example, into two equal halves, as desired, or for moving such blade edge into a second position, completely out of the way of the sheet 50 when such slitting is not desired.

Accordingly, in the present invention, a 17"×11" copy sheet exiting the fusing apparatus 46 sideways as described above, can be slit precisely into two 8.5"×11" halves, by means of such device 58. In essence therefore, a 2W×L dimension copy sheet (where, for example, 2W=17" and L=11") exiting the fusing apparatus 46 with a 2W dimension leading edge, can be similarly slit precisely into two W×L halves, by means of such device 58. Because of the mechanism 58, the copier or duplicator 10 of the present invention is advantageously capable of producing 17"×11" and 8.5"×11" copies while having only a single sheet supply source, as well as, single sheet handling apparatus for 17"×11" sheets.

Referring now to FIGS. 2A-3B, inclusion of the second lens L2 in addition to the first lens L1 in the optical imaging apparatus 40 of the present invention, effective enables the apparatus 40 to operate in a dual imaging mode. In such a mode, the apparatus 40 is capable of simultaneously forming two W×L electrostatic latent images of an object within a single 2W×L image frame during a single flash/exposure sequence step of the copier or duplicator 10.

The second lens L2 as shown is movable, and has a first position P3, as well as, a second position P4 relative to the center of a document being imaged. In its first position P3, the second lens L2 is offset a small distance $d_1$ from the center C of a document, for example, an 8.5"×11" document 75B on the platen 62. In its second position P4, the second lens L2 will be offset a second distance $d_2$, which is greater than $d_1$, from such center C such that reflected rays from the document being imaged are prevented from reaching the second lens L2 in such second position thereof. The first and second lenses L1, L2 are moved such that the second lens L2 is in its second position when the first lens L1 is also in its second, single imaging position, which is coincident with the center C of the document being imaged. Again when the first lens L1 is in its second position, all reflected rays from the document being imaged pass through or are focused only through the first lens L1. Therefore the second lens L2 will be in its second position P4 when the optical imaging apparatus 40 is in its single imaging mode.

However, when the lenses L1 and L2 are each in their respective first positions P1 and P3, where each is equally offset the small distance $d_1$ from the center C of a document, such as the document 75B, the apparatus 40 will be in its dual imaging mode. In this dual imaging mode as explained above, the apparatus 40 can simultaneously form two high quality 8.5"×11" or W+L images, within a single 17"×11" or 2W×L image frame ABDE, and during only a single flash/exposure sequence step of the copier or duplicator 10.

In the dual imaging mode, the light baffles 72, 74 additionally are adjusted so as to block, from the lenses L1, L2, light rays which may be reflected from beyond the outside edges of the document 75B. Such rays, if received and focused by the lenses L1 and L2 onto the image frame ABDE, will create an overlap about the centerline C (FIG. 3B), and consequently may interfere with the quality of the images $60B_1$, $60B_2$ near the center C.

Figure 2B:
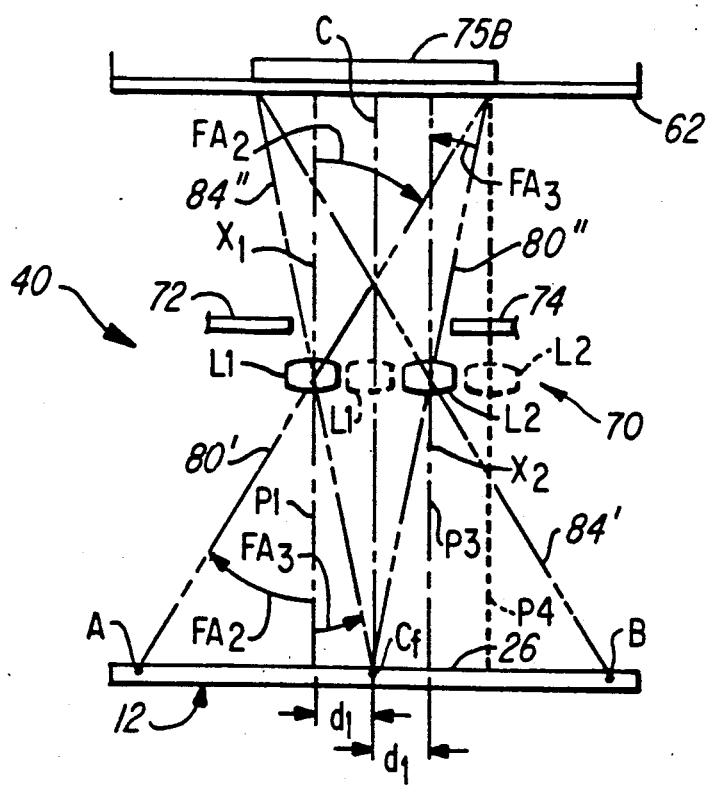
FIG. 2B is a schematic view of the apparatus of FIG. 2A in a dual imaging mode.

As shown in FIG. 2B, reflected outside rays 80' and 84" will be focused by the first lens L1, about its focal axis $X_1$, onto one half side $AC_fC_rE$ of the image frame ABDE. The light rays 80' and 84" will form two different size field angles $FA_2$ and $FA_3$, respectively, relative to the focal axis $X_1$. As shown, $FA_3$ for example is narrower than $FA_2$. Both however are narrower than $FA_1$ which is the field angle at which L1 is corrected for forming quality images of 17"×11" objects. Consequently, images formed by L1 at the smaller field angles $FA_2$ and $FA_3$ will also be high quality images.

Similarly, reflected outside rays 80" and 84' will be focused, as shown, by the second lens L2 about its focal axis $X_2$ onto the other half side $BC_fC_rD$ of the image frame ABDE. The light rays 80" and 84' will similarly form field angles $FA_2$ and $FA_3$, respectively, relative to the axis $X_2$. The lenses L1 and L2 may be, and are preferably made to be identical. Accordingly, besides being spaced or offset an equal distance $d_1$ from the center C of the document being imaged, the second lens L2 is also made corrected for a field angle $FA_1$. Accordingly, the second lens L2, like L1, will therefore also form a high quality image $60B_2$ at the smaller field angles $FA_2$, $FA_3$, within the side half $BC_fC_rD$ of the frame ABDE. The result is two high quality 8.5"×11" or generally W×L electrostatic latent images, for examples, $60B_1$, $60B_2$, formed simultaneously, during a single flash/exposure sequence step of the copier or duplicator 10.

In the copier or duplicator 10 of the present invention, the two latent images, for examples, $60B_1$, $60B_2$, thereafter can be developed at 42, transferred at 44 onto a 17"×11" or W×L copy sheet, and fused thereonto at 46—all as if the two W×L or 8.5"×11" images were but a single 2W×L or 17"×11" image. Furthermore, the 2W×L or 17"×11" copy sheet, following fusing at 46, can of course be precisely slit into two separate 8.5"×11" halves, by means of the mechanism 58. Such slitting will be along the centerline $C_fC_r$ as shown on the image frame ABDE. Each slit halve of course represents an 8.5"×11" sheet copy of the document 75B.

As an alternative to the slitting mechanism 58, the copier or duplicator 10 can be adapted to include apparatus for handling, transferring onto, and fusing two 8.5"×11" sheets in parallel, and simultaneously, at 54, 44 and 46 respectively.

When operating in the dual imaging mode as described above, the copier or duplicator 10 of the present invention, with a six (6) image frame, seventeen inch (17") wide photoconductor 12, will be capable, at any given speed of the photoconductor in revolutions per minute, to produce a maximum of 12, (not merely seven as is conventional), 8.5"×11" full images per single revolution of the photoconductor 12. This of course represents a substantial increase in the maximum number of such images from a copier or duplicator.

As can be seen, the copier or duplicator 10 of the present invention is capable of operating in a single imaging mode in which a single 2W×L or 17"×11" image can be formed and processed, during each single sequential process step of the copier or duplicator 10 including the optical flash/exposure imaging step thereof. Additionally, the copier/duplicator 10 is also capable of operating in a dual imaging mode in which two W×L or 8.5"×11" images can be formed and processed simultaneously during each single sequential process step of the copier or duplicator 10, particularly starting with the flash/exposure step thereof. Under the control of the LCU 28, the optical imaging apparatus 40, as well as the copier or duplicator 10, can be switched from the single imaging mode to the dual imaging mode. The inclusion of the post-fusing mechanism 58 for precisely slitting a 17"×11" sheet into two 8.5"×11" sheets also advantageously simplifies the sheet supply and handling apparatus of the copier or duplicator of the present invention.

Because of this dual imaging capability, the maximum number of 8.5"×11" or W×L copies that can be produced by the copier or duplicator 10, (at any given speed of the photoconductor 12 in revolutions per minute), can therefore be substantially increased, without increasing the power requirements or consumption of the copier/duplicator, and also without increasing the risk of failure of the moving components of such copier or duplicator.

Although the invention has been described with particular reference to a preferred embodiment, it is understood that modifications and variations thereof can be effected within the scope and spirit of such invention.

I claim:

1. A copier or duplicator in which an electrostatic latent image of an original can be formed, developed, and fixed to form a sheet copy of such original, the copier or duplicator including:
   (a) a movable endless photoconductive imaging member having a width 2W, and a plurality of 2W×L image areas; and
   (b) optical imaging apparatus including a plurality of lenses operable in a single imaging mode wherein a movable first lens has a first position coincident with the center axis of an original document object placed on an exposure platen of the copier or duplicator for forming a single 2W×L electrostatic latent image of the original document object in a single 2W×L image area of said imaging member, and in a dual imaging mode wherein said first lens has a second position offset a first predetermined distance to a first side of the center axis of an original document object placed on said platen, and a second lens has a position offset a second predetermined distance to a second and opposite side of the center axis of the original document object for simultaneously forming two L×W electrostatic latent images of the original document object in a single 2W×L image area of said imaging member.

2. The copier or duplicator of claim 1 wherein said width 2W of said photoconductive imaging member is seventeen inches (17").

3. The copier or duplicator of claim 1 wherein said 2W×L dimension of each said image area is 17"×11".

4. The copier or duplicator of claim 1 further including a post-fusing mechanism for slitting a 2W×L dimension copy sheet into two L×W dimension halves.

5. The copier or duplicator of claim 1 wherein said optical imaging apparatus further includes:
   (a) a transparent platen large enough to hold a 2W×L original document object;
   (b) means for illuminating an original document object on said platen; and
   (c) means for controlling light rays, reflected from such illuminated document, through said plurality of lenses.

6. The copier or duplicator of claim 1 wherein said plurality of lenses of said optical imaging apparatus includes first and second movable lenses each having first and second postions therein relative to the center axis of a document being imaged.

7. The optical imaging apparatus of claim 4 wherein said sheet slitting mechanism is movable between a first position in which said mechanism is in the path of a post-fusing moving sheet, and a second position in which said mechanism is completely out of the way of such sheet.

8. The copier or duplicator of claim 6 wherein in the dual imaging mode said first position of each said lens is offset an equal distance $d_1$ from said center axis of such document.

9. In an electrophotographic copier or duplicator, including a photoconductive member having a width 2W, and a 2W×L image area, optical imaging apparatus for forming a latent charge image of an original document object within such 2W×L image area of said photoconductive member, the optical imaging apparatus comprising:

(a) a transparent platen spaced from the photoconductive member, said platen being large enough to hold a 2W×L original document object for imaging within said 2W×L image area of said photoconductive member;

(b) means for illuminating an original document object on said platen;

(c) control means for controlling image light rays reflected by such document object on said platen;

(d) a plurality of lenses operable in a single imaging mode wherein a movable first lens has a first position coincident with the center axis of an original document object placed on said exposure platen of the copier or duplicator for forming a single 2W×L electrostatic latent image, of the original document object on said platen, within said 2W×L image area, and in a dual imaging mode wherein said first lens has a second position offset a first predetermined distance to a first side of the center axis of an original document object placed on said platen, and a second lens has a position offset a second predetermined distance to a second and opposite side of the center axis of the original document object for simultaneously forming two L×W electrostatic latent images, of the original document on said platen, within said 2W×L image area; and (e) means for switching the operation of said plurality of lenses from said single imaging mode to said dual imaging mode.

10. The optical imaging apparatus of claim 9 wherein said plurality of lenses includes first and second movable lenses each having first and second positions therein relative to the center axis of a document being imaged.

11. The optical imaging apparatus of claim 9 wherein said light ray control means includes first and second baffles for preventing light rays, reflected from beyond the outside edges of an original document object on said platen, from reaching said plurality of lenses.

12. The optical imaging apparatus of claim 10 wherein in the dual imaging mode said first position of each said lens is offset an equal distance $d_1$ from said center axis of such document.

13. The optical imaging apparatus of claim 10 wherein in said single imaging mode, said second lens is offset a second distance $d_2$ greater than $d_1$ from the center axis of the document being imaged such that reflected rays from such document are prevented from reaching said second lens.

14. The optical imaging apparatus of claim 13 wherein when said first lens is in said second position, said second lens is also in its second position where it is offset from the center axis of a document being imaged such that all light rays reflected from such document are prevented from reaching said second lens and are therefore focused only through said first lens.

15. A copier or duplicator for electrophotographically producing copies of an original document on suitable receiver sheets, the copier or duplicator including:

(a) a movable endless photoconductive member having a width 2W and a plurality of image frames each having an image dimension 2W×L;

(b) means for electrostatically charging said photoconductive member;

(c) optical imaging apparatus operable in a single imaging mode wherein a movable first lens has a first position coincident with the center axis of an original document object placed on an exposure platen of the copier or duplicator for forming a single 2W×L electrostatic latent image of the original document object in a single image frame of said imaging member, and in a dual imaging mode wherein said first lens has a second position offset a first predetermined distance to a first side of the center axis of an original document object placed on said platen, and a second lens has a position offset a second predetermined distance to a second and opposite side of the center axis of the original document object for simultaneously forming two L×W electrostatic latent images of the original document object in a single image frame of said imaging member, said first and second lenses being offset an equal distance $d_1$ each from said center axis of such document when in said dual imaging mode;

(d) means for developing said electrostatic latent images with charged toner particles;

(e) means for transferring the toner developed images from the image bearing member onto a suitable receiver sheet;

(f) means for fusing the transferred images onto such receiver sheet in order to create a sheet copy of the original document; and (g) post-fusing means for handling such a sheet copy for subsequent removal by an operator.

16. A copier or duplicator in which an electrostatic latent image of an original document object can be formed, developed, and fixed to form a sheet copy of such original, the copier or duplicator having:

(a) a movable endless photoconductive member having a width 2W, and a plurality of 2W×L image areas; and (b) optical imaging apparatus having a plurality of lenses including first and second movable lenses operable in a single imaging mode wherein a movable first lens has a first position coincident with the center axis of an original document object placed on an exposure platen of the copier or duplicator for forming a single 2W×L image of the original document object positioned on an exposure platen in a single 2W×L image area of said photoconductive member, and in a dual imaging mode wherein said first lens has a second position offset a first predetermined distance to a first side of the center axis of an original document object placed on said platen, and a second lens has a position offset a second predetermined distance to a second and opposite side of the center axis of the original document object for simultaneously forming two L×W images of the original document object in a single 2W×L image area thereof, said first and second lenses each being movable from a first position to a second position relative to the center axis of such original document object on such platen.

* * * * *